(12) United States Patent
Cornelius et al.

(10) Patent No.: US 12,045,077 B2
(45) Date of Patent: Jul. 23, 2024

(54) CRANK HANDLE ASSEMBLY

(71) Applicant: Tramec Sloan, L.L.C., Holland, MI (US)

(72) Inventors: Kevin Cornelius, Lees Summit, MO (US); Craig Herweyer, Holland, MI (US); Stuart Anderson, Montague, MI (US); Miklos A. Kovach, West Olive, MI (US)

(73) Assignee: Tramec Sloan, L.L.C., Holland, MI (US)

( * ) Notice: Subject to any disclaimer, the term of this patent is extended or adjusted under 35 U.S.C. 154(b) by 0 days.

(21) Appl. No.: 17/472,775

(22) Filed: Sep. 13, 2021

(65) Prior Publication Data

US 2023/0085058 A1    Mar. 16, 2023

(51) Int. Cl.
| | | |
|---|---|---|
| *G05G 1/08* | (2006.01) | |
| *G05G 1/10* | (2006.01) | |
| *B60D 1/66* | (2006.01) | |
| *B60S 9/04* | (2006.01) | |

(52) U.S. Cl.
CPC ............... *G05G 1/085* (2013.01); *G05G 1/10* (2013.01); *B60D 1/66* (2013.01); *B60S 9/04* (2013.01)

(58) Field of Classification Search
None
See application file for complete search history.

(56) References Cited

U.S. PATENT DOCUMENTS

| | | | | |
|---|---|---|---|---|
| 1,197,671 A | * | 9/1916 | Schneider et al. | B66D 1/14 |
| | | | | 254/362 |
| 2,701,379 A | * | 2/1955 | Balistreri | B25G 1/00 |
| | | | | 473/294 |
| 5,143,056 A | * | 9/1992 | Yih-Jong | B62K 21/26 |
| | | | | 601/118 |
| 7,303,210 B2 | * | 12/2007 | Baxter | B60S 9/08 |
| | | | | 254/419 |
| 9,809,072 B2 | | 11/2017 | Beck et al. | |
| 11,465,597 B2 | | 10/2022 | Gallego | |
| 2006/0156857 A1 | * | 7/2006 | Turner | G05G 1/085 |
| | | | | 74/545 |
| 2006/0202461 A1 | | 9/2006 | Baxter et al. | |
| 2008/0164683 A1 | | 7/2008 | VanDenberg | |

(Continued)

FOREIGN PATENT DOCUMENTS

| | | | | |
|---|---|---|---|---|
| CN | 201268376 Y | * | 7/2009 | |
| CN | 201268376 Y | | 7/2009 | |
| CN | 112299278 A | * | 2/2021 | ............... B60S 9/04 |

(Continued)

OTHER PUBLICATIONS

European Patent Office, Extended European Search report re Corresponding Application No. 22193524.0-1009, Feb. 6, 2023, 7 pages, Munich, Germany.

(Continued)

*Primary Examiner* — Vicky A Johnson
(74) *Attorney, Agent, or Firm* — McGarry Bair PC (57) ABSTRACT

An apparatus for a crank handle of a landing gear. The crank handle comprising an assembly with a rotating arm, a mounting end, a handle arm, and a handle grip. The handle grip mounted to the handle arm. The handle grip rotatable about the handle arm at a handle end of the crank handle assembly.

20 Claims, 8 Drawing Sheets

(56) References Cited

U.S. PATENT DOCUMENTS

2010/0237300 A1* 9/2010 Robledo ................ B66F 13/00
74/545

FOREIGN PATENT DOCUMENTS

| DE | 102019005385 | B3 | 10/2020 |
| EP | 2942691 | A2 | 11/2015 |
| WO | 2009011865 | A2 | 1/2009 |

OTHER PUBLICATIONS

European Patent Office, European Communication Re: Corresponding Application No. 22193524.0-1009, Jun. 4, 2024, 8 pages, Munich, Germany.

* cited by examiner

CRANK HANDLE ASSEMBLY

TECHNICAL FIELD

The disclosure generally relates to a crank handle assembly, and more specifically to a handle grip for a crank handle.

BACKGROUND

Trailers can be lifted and lowered via a crank attached to a spindle operated lifting jack. The crank provides a desired mechanical advantage for turning the crankshaft and also results in ease of operation as a consequence of the simple cranking action.

Cranks typically include handles that are made of the same material as the crank itself. Additionally, the handle provided can lock up due to rust which in turn decreases the life of the crank.

BRIEF DESCRIPTION OF THE DRAWINGS

A Full and Enabling Disclosure, Including the Best Mode Thereof, Directed to One of Ordinary Skill in the Art, is Set Forth in the Specification, which Refers to the Appended Figures in which.

DETAILED DESCRIPTION

Aspects of the disclosure described herein are directed to a handle grip. More specifically a composite handle grip, in one non-limiting example for attachment to a crank handle. For purposes of illustration, the present disclosure will be described with respect to the crank handle with respect to a trailer jack handle and a landing gear system for a truck trailer. It will be understood, however, that aspects of the disclosure described herein are not so limited and may have general applicability within other mobile applications and non-mobile industrial, commercial, and residential applications.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
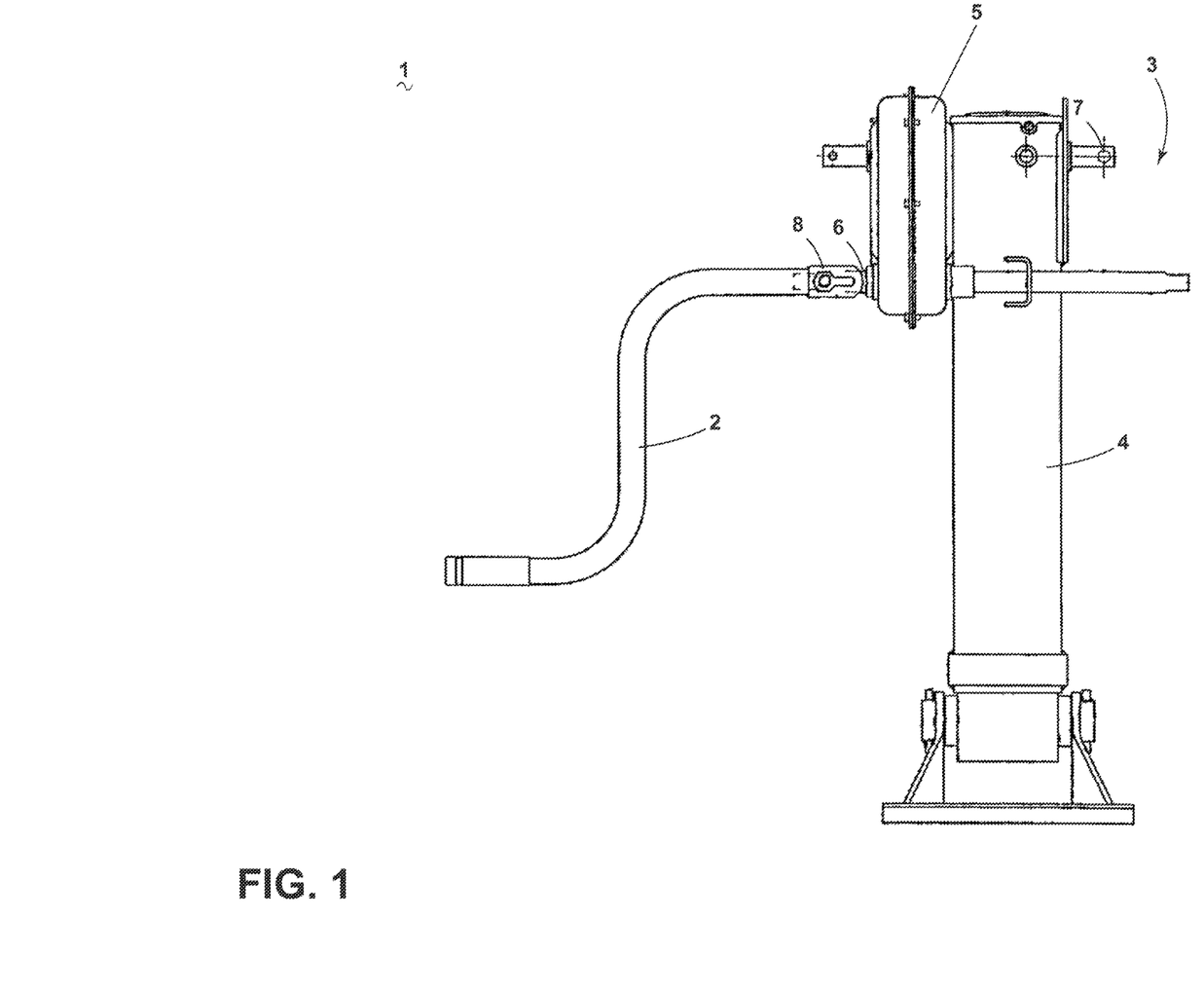
FIG. 1 is an elevation view of a landing gear with a crank handle.

FIG. 1 illustrates a landing gear 1 with a crank handle 2. By way of non-limiting example, the landing gear is a single leg assembly 3 with a telescopic leg 4, and a gear box 5 which is actuated by the crank handle 2 through an input shaft 6. An output shaft 7 can connect to a cross shaft which can in turn connect to a second leg (not shown). While illustrated as a landing gear 1, it should be understood that the landing gear 1 can be any jack utilized for lifting large pieces of equipment, including but not limited to a tractor trailer. The crank handle can be in the form of an "S" shape. A two-way connector 8 can be utilized for mounting the crank handle 2 to the input shaft 6. The two-way connected can enable the crank handle 2 to move between a stored and operating position.

Figure 2:
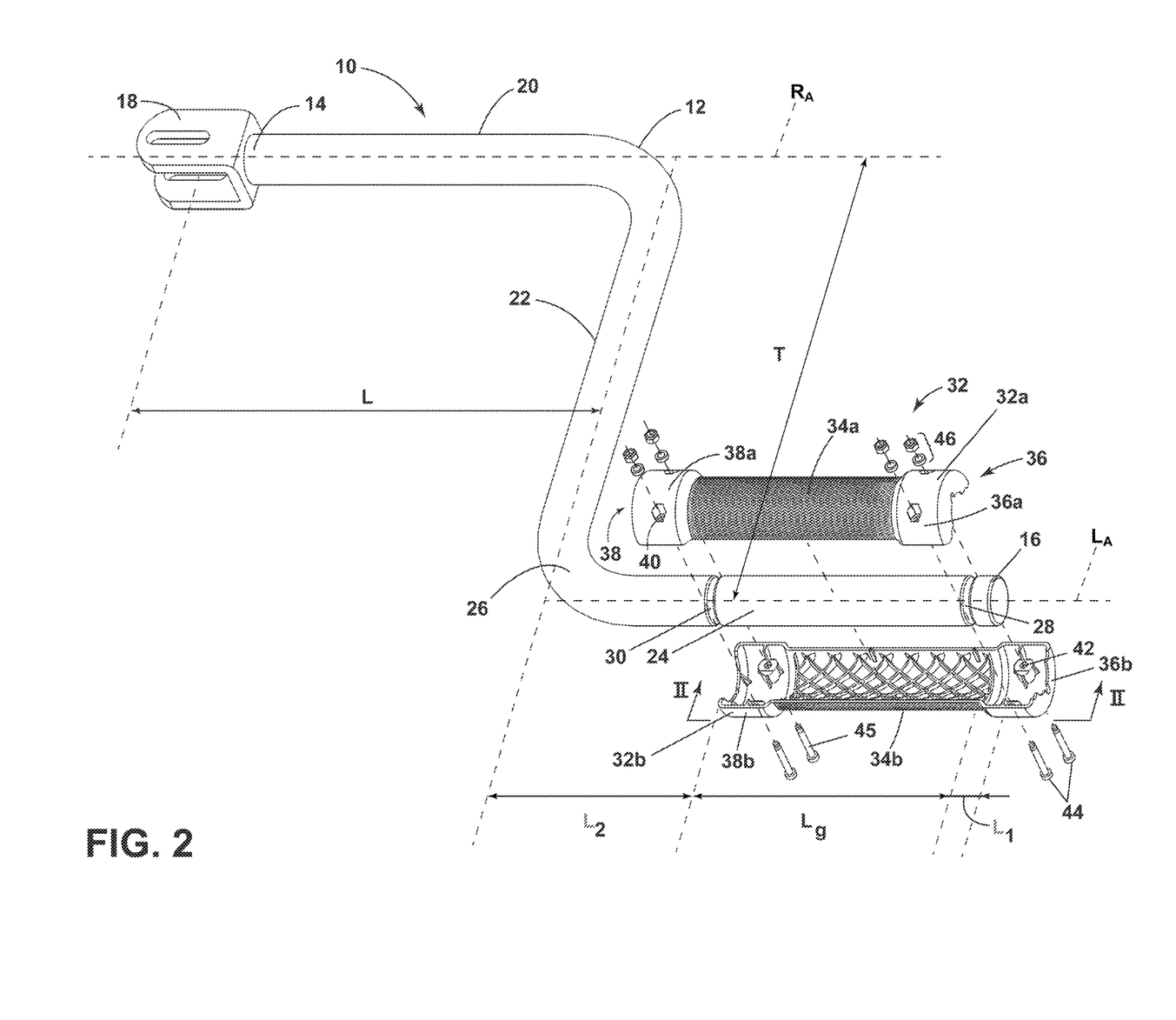
FIG. 2 is an exploded view of a crank handle assembly with a handle grip.

FIG. 2 is an enlarged view of a crank handle assembly 10 according to an aspect of the disclosure herein is illustrated. The crank handle assembly 10 can be mounted to, by way of non-limiting example, the landing gear of FIG. 1. The crank handle assembly 10 can have a body 12 extending between a mount end 14 and a handle end 16. The mount end 14 can be a two-way connector 8 and be mountable to the input shaft 6 of the landing gear as illustrated in FIG. 1. The handle end 16 can be rotatable about the mount end 14. The mount end 14 can include any suitable mounting fixture 18 for attaching the crank handle assembly 10 to, by way of non-limiting example, a trailer landing gear. The body 12 can include a mounting arm 20, a radial arm 22, and a handle arm 24. The mounting arm 20 can define a rotational axis (RA) and extend between the mount end 14 and the radial arm 20 a length (L). In one aspect the crank handle assembly 10 is rotatably mounted to the landing gear in order to rotate freely about the handle arm 24 during operation. The handle arm 24 can be radially spaced from the mounting arm a throw distance (T) and extend between the radial arm 22 and the handle end 16 to define a longitudinal axis ($L_A$). In a non-limiting example the radial arm 22 is attached to the mounting arm 20 and the handle arm 24 by elbows 26. It is further contemplated that the body 12 is one continuous piece including the mounting arm 20, the radial arm 22, the handle arm 24, and the elbows 26. The body 12 can further include the mounting fixture 18 in the continuous piece. The body 12 can be formed of any suitable material, including but not limited to stainless steel, steel, aluminum, or plastic. It is further contemplated that the body 12 is powder coated, galvanized, or E-coated.

The handle arm 24 can include at least one groove, illustrated as a pair of grooves 28, 30 spaced a grip length (Lg) apart. A first groove 28 of the pair can be spaced from the handle end 16 a first distance (L1). A second groove 30 of the pair can be spaced from the first groove 28 the grip length (Lg) and spaced from a center of the radial arm 22 a second distance (L2). The grooves 28, 30 can fully circumscribe the handle arm 24. The grip length (Lg) can be long enough to accommodate two hands of a user.

A handle grip 32 having an elongated grip portion 34 extending from at least one connecting portion, illustrated as a pair of connecting portions 36, 38 is shown in an exploded view around the handle arm 24. Each of the pair of connecting portions 36, 38 can include at least one hole, by way of non-limiting example a mounting hole 40 and a receiving hole 42. The elongated grip portion 34 can extend between the pair of connecting portions 36, 38 to define a dog-bone shape. While a pair of connecting portions 36, 38 is illustrated, it should be understood that a single connecting portion is contemplated, by way of non-limiting example for a single hand. In this respect, the grip length (Lg) can be shorter to accommodate one hand of a user.

The handle grip 32 can be formed in two parts, a first part 32a, and a second part 32b mirroring the first part such that each part includes the elongated grip portion 34a, 34b and the at least one connecting portion 36a, 36b, 38a, 38b. In one example, the connecting portions 36a, 38a of the first part 32a each include a pair of mounting holes 40. The connecting portions 36b, 38b of the second part can in turn each include a pair of receiving holes 42.

When assembled, at least one fastener, by way of non-limiting example a shoulder bolt 44, can be received in the receiving hole 42. A shoulder portion 45 of the shoulder bolt 44 can extend through the connecting portion 36b of the second part 32b and into the mounting hole 40 of the connecting portion 36a of the first part 32a. Another fastener 46, by way of non-limiting example a nut and washer set or a nylon-insert nut, can be used to secure the shoulder bolt 44 and in turn connect the first and second parts 32a, 32b to each other to form the handle grip 32.

Figure 3:
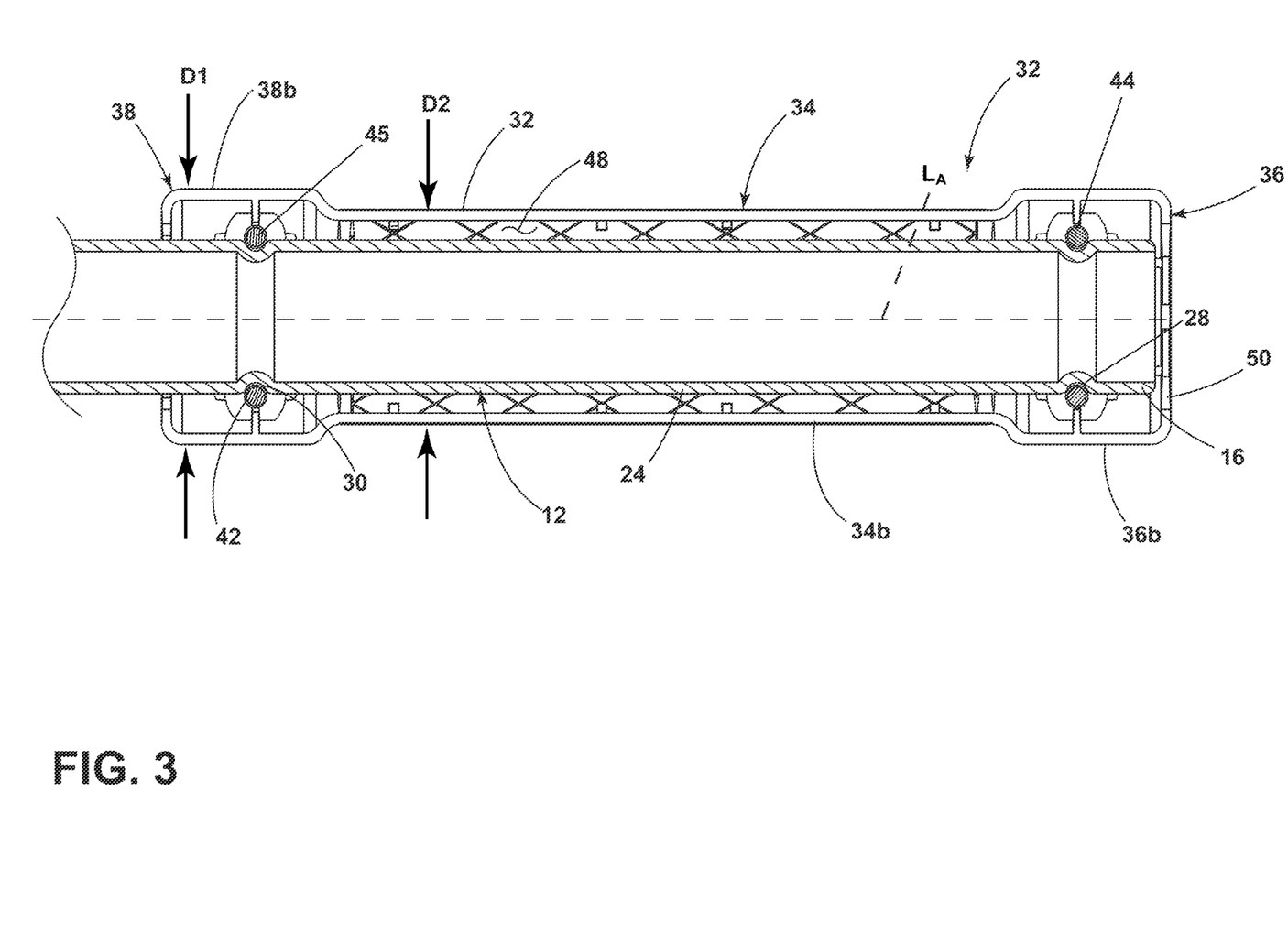
FIG. 3 is a cross-sectional view of an assembled crank handle assembly at the handle grip along line II-II of FIG. 2.

Turning to FIG. 3, a cross-sectional view of an assembled handle grip 32 around the handle arm 24 is illustrated. It can more clearly be seen that the shoulder portion 45 of the shoulder bolt 44 act as bearings received in the at least one groove 28. In operation, the handle grip 32 can freely rotate about the handle arm 24. The elongated portion 34 is spaced from the handle arm 24 to define an interior 48 of the assembled handle grip 32. Each connecting portion 36, 38 can define a first dimension (D1) and the elongated portion can define a second dimension (D2) smaller than the first dimension (D1). At least one drain hole 50 can be formed in one or both of the connecting portions 36, 38. The at least one drain hole 50 allows for any moisture formed or collected within to drain out of the interior 48 of the handle grip 32.

Figure 4:
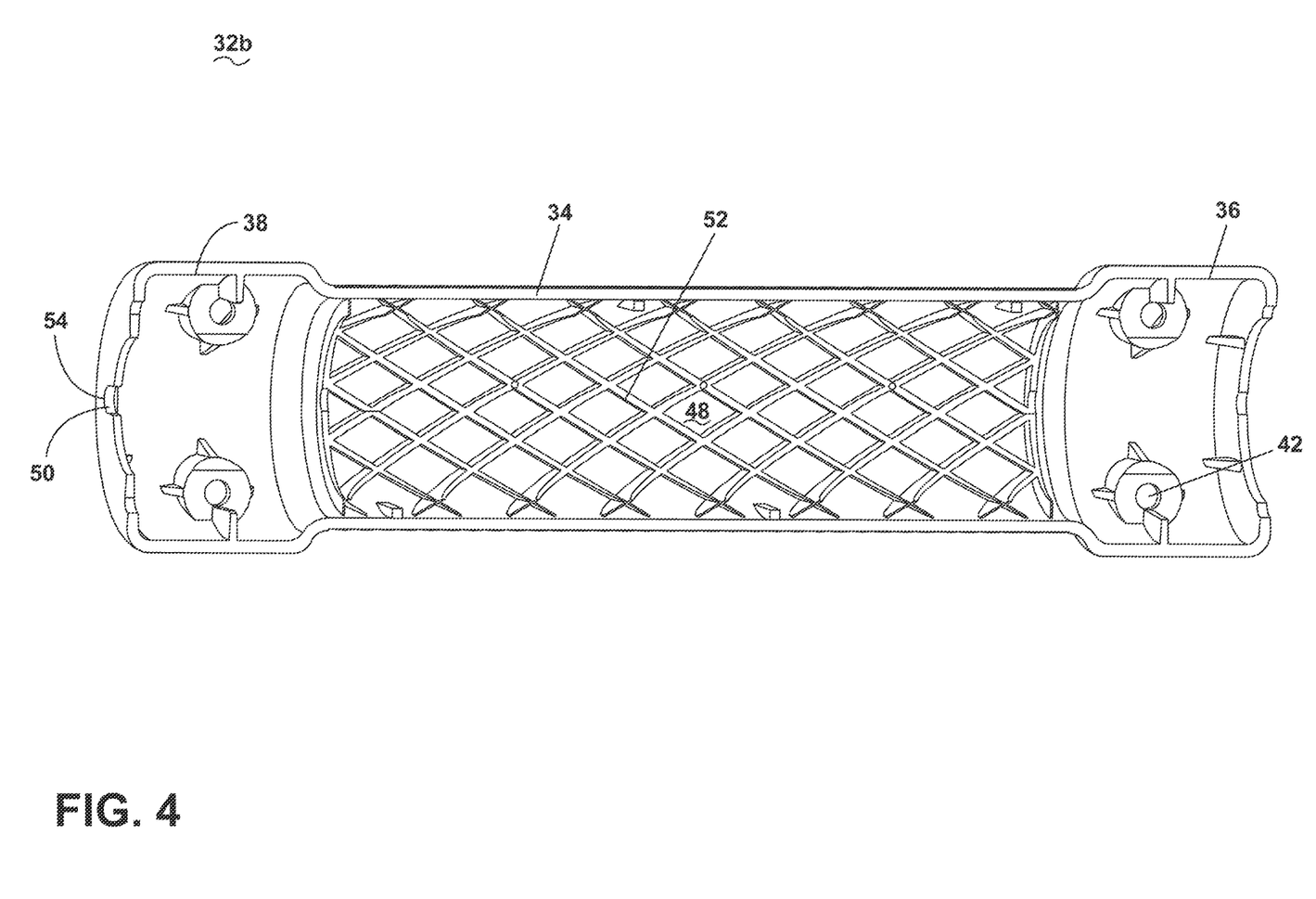
FIG. 4 is an interior perspective view of a portion of the handle grip of FIG. 3.

Turning to FIG. 4, an interior 48 of one of the two parts of the handle grip 32, by way of non-limiting example the second part 32b, is illustrated. It can more clearly be seen that a structural grid 52 can be formed in the interior 48 along the elongated portion 34. The structural grid 52 can be a grid formed from a tessellation of a diamond shape as illustrated. It is further contemplated that any structural grid 52, including but not limited to a honeycomb pattern, can be formed in the interior 48. At least one cut out 54 defining at least a portion of the at least one drain hole 50 can be formed in one or both of the connecting portions 36, 38 as illustrated.

Figure 5:
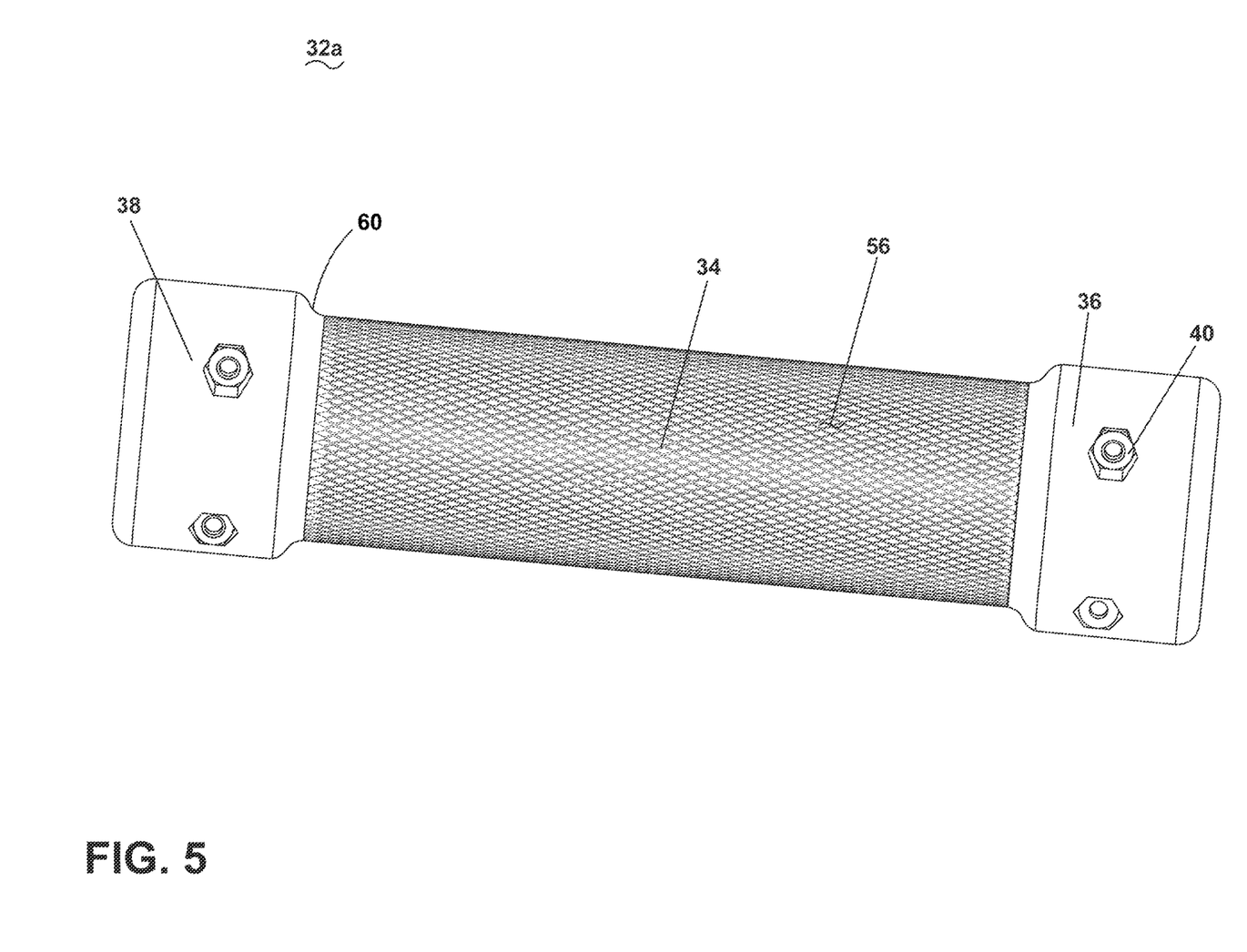
FIG. 5 is an exterior perspective view of a portion of the handle grip of FIG. 3.

Turning to FIG. 5, an exterior 56 of one of the two parts of the handle grip, by way of non-limiting example the first part 32a, is illustrated. It can more clearly be seen that the exterior 56 can be a raised surface formed from a tessellation of a diamond shape as illustrated, any pattern, however, is contemplated. It should be understood that the exterior 56 includes small indents defining the diamond shapes raised to define a roughened exterior. The structural grid 52, on the other hand, is formed from raised walls defining the diamond shapes therebetween. The exterior 56 is beneficial for holding by a user, while the structural grid 52 is beneficial for rigidity and life of the handle grip 32. The elongated grip portion 34 can transition from the toughened exterior to the first connecting portion 36 and the second connecting portion 38 at a sloped portion 60.

The handle grip 32 can be formed of a composite material, by way of non-limiting example glass-filled nylon, Acrylonitrile Butadiene Styrene (ABS), polycarbonate, glass-filled polypropylene, Polycarbonate and Polybutylene Terephthalate blend (PC+PBT), and Acetal. The handle grip and other complex geometries as described herein can be formed, for example, by additive manufacturing, while traditional methods of manufacture are contemplated.

Figure 6:
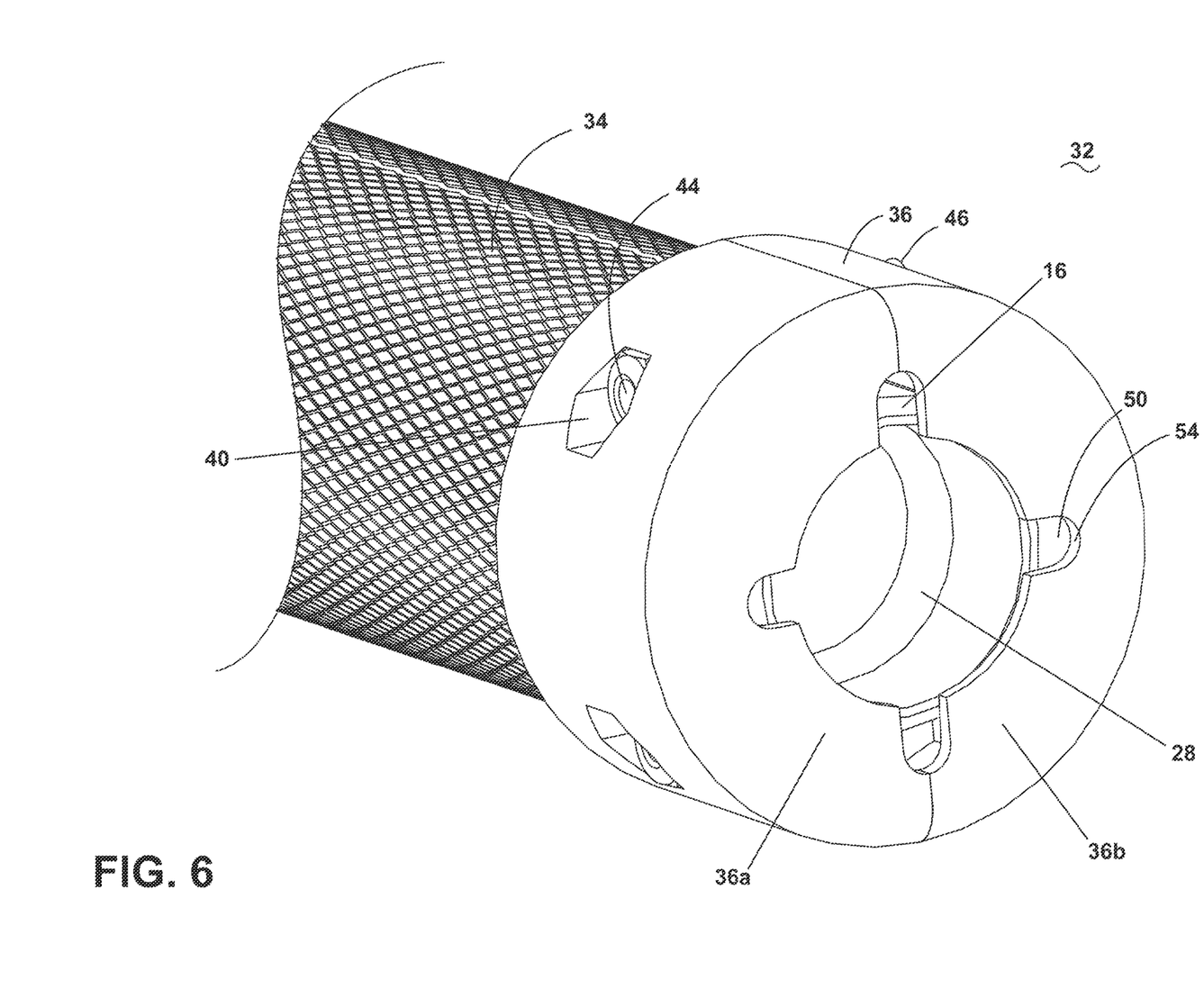
FIG. 6 is a perspective view of an end of the handle grip of FIG. 3.

FIG. 6 is a perspective view of the connecting portion 36. It can more clearly be seen that the cut-out 54 can abut the handle end 16 to form the drain hole 50 open to the interior 48. While the handle end 16 and cut-out 54 can abut each other, the handle grip 32 can still be rotatable about the handle arm 24. In other words, an abutment of the handle end 16 and the connecting portions 36, 38 does not prevent rotation of the handle grip 32.

Figure 7:
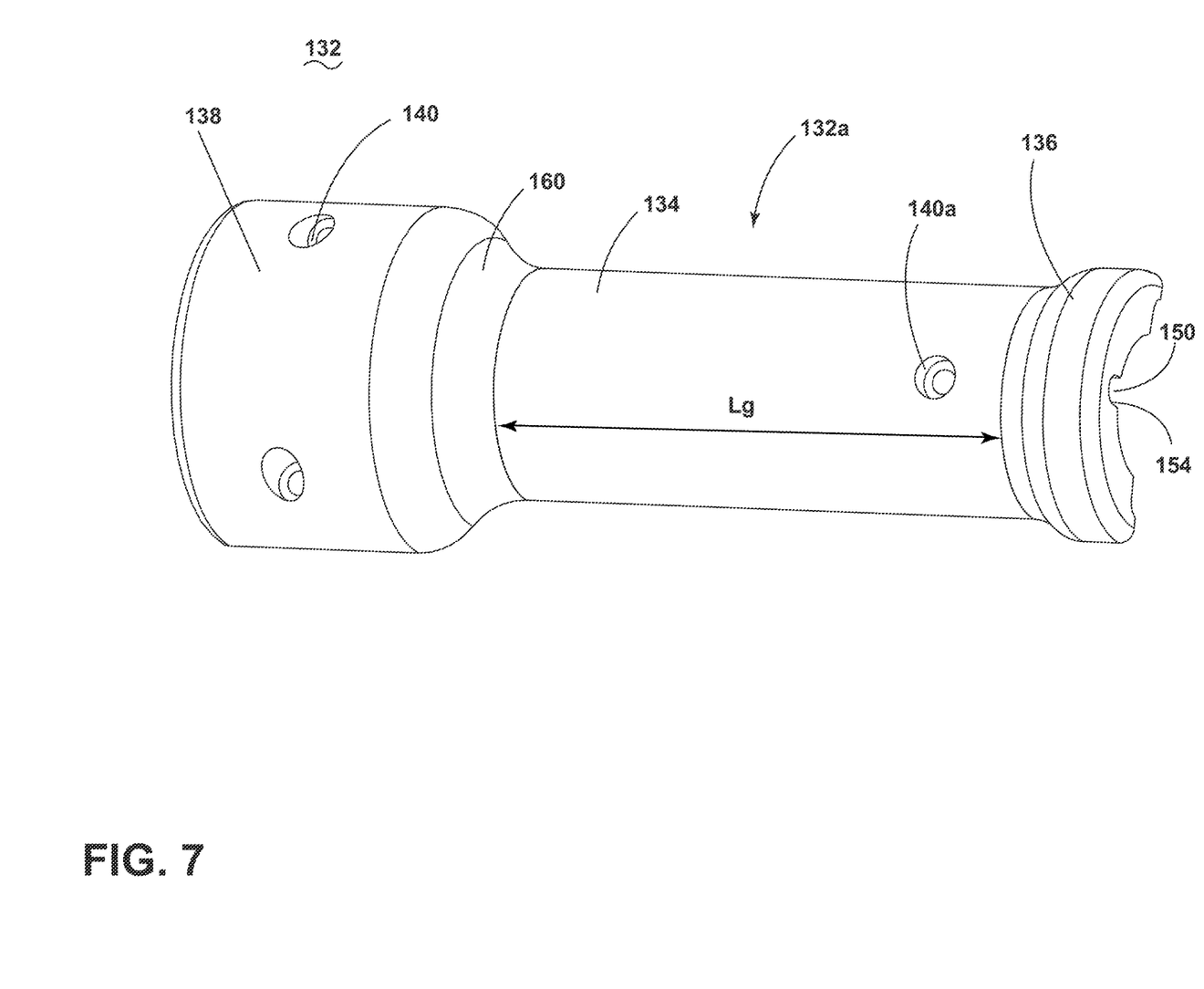
FIG. 7 is an exterior perspective view of a variation of a portion of a handle grip for the landing gear of FIG. 1 according to another aspect of the disclosure herein.

FIG. 7 is a variation of a handle grip 132 according to another aspect of the disclosure herein. The handle grip 132 is substantially similar to the handle grip 32, therefore, like parts will be identified with like numerals increased by 100. It should be understood that the description of the like parts of the handle grip 32 applies to the handle grip 132 unless otherwise noted.

The handle grip 132 can have two parts, a first part 132a is illustrated and can have an elongated grip portion 134 extending from at least one connecting portion, illustrated as a pair of connecting portions 136, 138. A first connecting portion 136 can be smaller than a second connecting portion 138 as illustrated. The elongated grip portion 134 can extend between the pair of connecting portions 136, 138. A grip length (Lg) can be shorter than the grip length (Lg) of handle grip 132 to accommodate one hand of a user rather than two. The second connecting portion 138 can include at least one hole, by way of non-limiting example a mounting hole 140. An additional mounting hole 140a can be located in the elongated grip portion 134. In this manner it is also contemplated that the smaller first connecting portion 136 is even smaller or not present at all.

The elongated grip portion can transition to the second connecting portion 138 in at a sloped portion 160. The sloped portion 160 can be ergonomically shaped to accommodate the interior of a user's hand.

Figure 8:
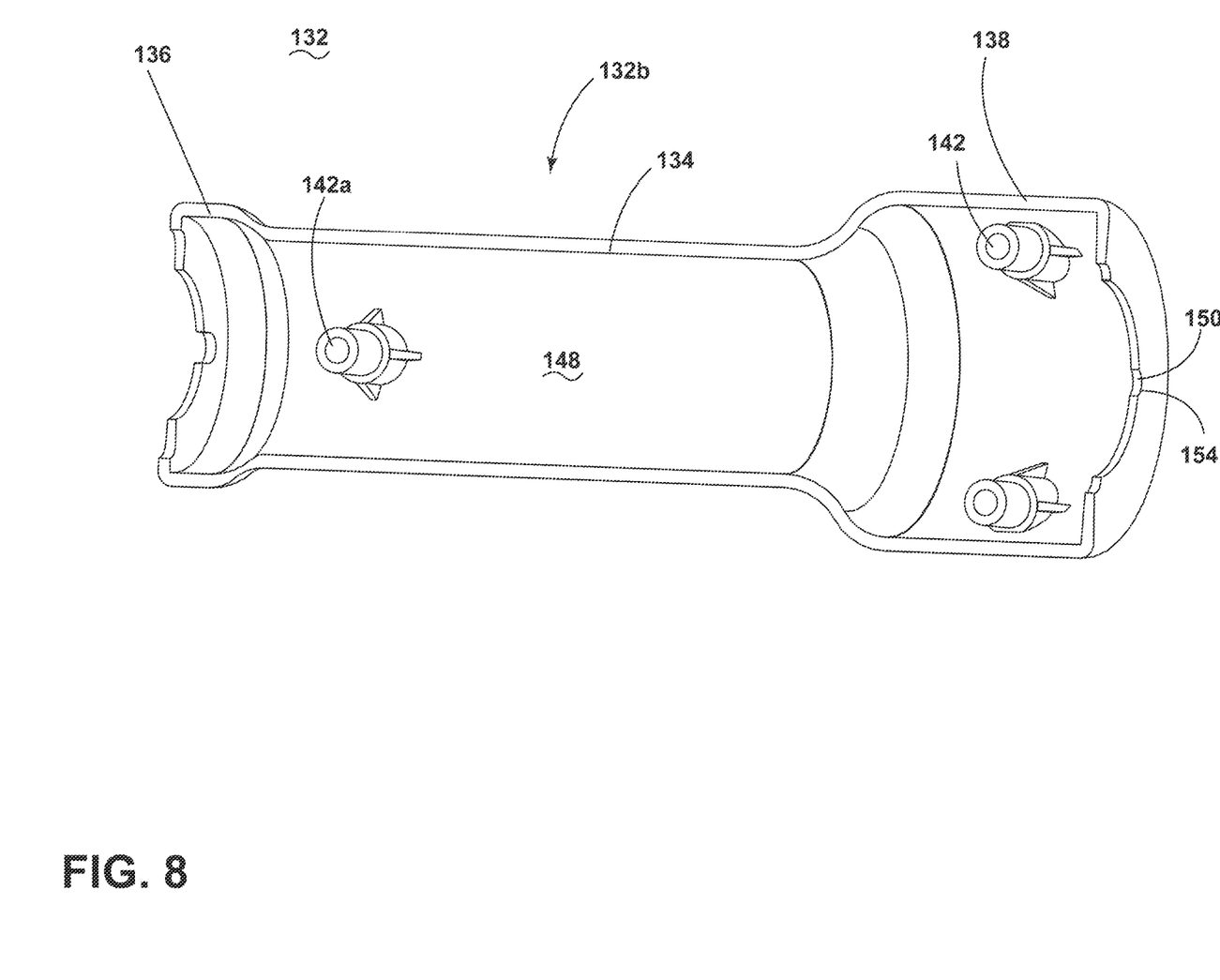
FIG. 8 is an interior perspective view of a variation of a portion of the handle grip for the landing gear of FIG. 1 according to another aspect of the disclosure herein.

Turning to FIG. 8, a second part 132b of the handle grip 132 is illustrated. The second connecting portion 138 can include at least one hole, by way of non-limiting example a receiving hole 142. An additional receiving hole 142a can be located in the elongated grip portion 134.

The handle grip 132 can be formed of a composite material, by way of non-limiting example glass-filled nylon, Acrylonitrile Butadiene Styrene (ABS), polycarbonate, glass-filled polypropylene, Polycarbonate and Polybutylene Terephthalate blend (PC+PBT), and Acetal. The handle grip and other complex geometries as described herein can be formed, for example, by additive manufacturing, while traditional methods of manufacture are contemplated.

Benefits associated with the disclosure as described herein include an increased life of the handle grip and crank handle assembly as a whole. Furthermore, providing rotatability around the handle arm makes the crank handle assembly user-friendly. Less strain is put on the user which decreases or eliminates the possibility user fatigue and/or strain. Additionally, the material of the handle grip eliminates the possibility of the handle grip and handle arm seizing together. The drain holes further help to prevent any rusting of any metal elements from occurring.

Other benefits include an elongated length of the handle allowing for a two-handed grip, giving the user more stability and the ability to apply more force to the crank. Further, the shoulder bolts as described herein enable a smoother operation when the handle rotates about the shaft. Additionally, the manufacturing process of this method allows for secondary addition of the handle itself, allowing the crank to be completely coated along the entire length either with an e-coat, powder coat, or galvanizing, providing the crank with an extended life.

It should be appreciated that the handle grip as described herein can be provided for any handle and is not limited to crank handles as described herein. Furthermore, it should be appreciated that the handle grip as described herein can have additional applicability to other industries, and is not limited to truck trailers as described herein.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A crank handle assembly for raising and lowering landing gear, the crank handle assembly comprising a coated body having a handle arm terminating in a handle end and a handle grip mounted to the handle arm at the handle end, the handle grip formed from a composite material and rotatable about the handle arm.

2. The crank handle assembly of claim 1 further comprising at least one groove in the handle arm and at least one bearing in the handle grip received in the groove.

3. The crank handle assembly of claim 2 wherein the bearing is a shoulder bolt, and a shoulder portion of the shoulder bolt is received in the groove.

4. The crank handle assembly of claim 1, wherein the handle grip further comprises at least one connecting portion defining a first dimension.

5. The crank handle assembly of claim 4, further comprising an elongated grip portion terminating in the at least one connecting portion.

6. The crank handle assembly of claim 5 wherein the elongated grip portion transitions to the at least one connecting portion at a sloped portion.

7. The crank handle assembly of claim 6 further comprising a first connecting portion mounted to the handle end and the at least one connecting portion is a second connecting portion and the elongated grip portion extends between the second connecting portion and the first connecting portion.

8. The crank handle assembly of claim 7 wherein the first connecting portion has a smaller first dimension than the second connecting portion.

9. The crank handle assembly of claim 5 wherein the at least one connecting portion is multiple connecting portions located at opposing ends of the elongated grip portion.

10. The crank handle assembly of claim 1 wherein the handle end further comprises at least one groove.

11. The crank handle assembly of claim 10 wherein the handle grip further comprises a bearing received in the groove.

12. The crank handle assembly of claim 11 wherein the handle grip comprises two parts each part comprising a pair of connecting portions connected to each other by an elongated grip portion.

13. The crank handle assembly of claim 12 wherein the two parts are connected to each other by fasteners extending through each of the pair of connecting portions, the fasteners received in the groove.

14. The crank handle assembly of claim 13 wherein the fasteners are shoulder bolts, and a shoulder portion of the shoulder bolt is received in the groove.

15. A handle grip comprising:
 a first part formed as a single piece having at least one connecting portion and a first elongated grip portion extending from the at least one connecting portion;
 at least one fastener extending through the at least one connecting portion; and
 a second part formed as a single piece and connected to the first part with the at least one fastener extending through a corresponding at least one connecting portion, the second part including a second elongated grip portion;
 wherein together the first elongated grip portion and the second elongated grip portion define an exterior surface circumscribing a longitudinal axis and a first dimension is measured perpendicular to the longitudinal axis between opposite sides of the exterior surface;
 wherein together the at least one connecting portion and the corresponding at least one connecting portion define a second dimension perpendicular to the longitudinal axis; and
 wherein the first dimension is less than the second dimension.

16. The handle grip of claim 15 wherein the at least one connecting portion is multiple connecting portions located at opposing ends of the elongated grip portion.

17. The handle grip of claim 15 wherein the handle grip comprises two parts mirroring each other.

18. The handle grip of claim 17 wherein the two parts are connected to each other by fasteners extending through the at least one connecting portion.

19. The handle grip of claim 18 wherein the fasteners are shoulder bolts, and a shoulder portion of the shoulder bolt is a bearing.

20. A crank handle assembly comprising:
 a body extending between a first end mountable to a jack and a handle arm rotatable about the first end and having at least one groove circumscribing the handle arm; and
 a handle grip rotatably mounted to the handle arm and having at least one bearing received in the at least one groove;
 wherein the bearing is a shoulder bolt, and a shoulder portion of the shoulder bolt is received in the groove.

* * * * *